(12) United States Patent
Matsuoka et al.

(10) Patent No.: US 7,608,666 B2
(45) Date of Patent: Oct. 27, 2009

(54) POLYESTER RESIN COMPOSITION (75) Inventors: Hideo Matsuoka, Ichinomiya (JP); Mitsushige Hamaguchi, Nagoya (JP); Toru Nishimura, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/555,208

(22) PCT Filed: Apr. 28, 2004

(86) PCT No.: PCT/JP2004/006198

§ 371 (c)(1),
(2), (4) Date: Nov. 21, 2005

(87) PCT Pub. No.: WO2004/096912

PCT Pub. Date: Nov. 11, 2004

(65) Prior Publication Data

US 2006/0178481 A1 Aug. 10, 2006

(30) Foreign Application Priority Data

| May 2, 2003 | (JP) | ............... 2003-127493 |
| Jun. 16, 2003 | (JP) | ............... 2003-171167 |
| Jun. 16, 2003 | (JP) | ............... 2003-171292 |

(51) Int. Cl.
*C08L 23/00* (2006.01)

(52) U.S. Cl. ............... 525/177; 525/64; 525/68; 525/166

(58) Field of Classification Search ............... 525/177, 525/166, 64, 68
See application file for complete search history.

(56) References Cited

U.S. PATENT DOCUMENTS 4,461,871 A * 7/1984 Kometani et al. ............ 525/166

(Continued)

FOREIGN PATENT DOCUMENTS

JP 62-218442 A 9/1987

(Continued)

OTHER PUBLICATIONS

English translation of abstract of JP 62218442A.*

(Continued)

*Primary Examiner*—Randy Gulakowski
*Assistant Examiner*—Alicia M Toscano
(74) *Attorney, Agent, or Firm*—DLA Piper LLP (US)

(57) ABSTRACT

This invention is a polyester resin composition comprising 100 parts by weight of a resin composition consisting of 60 to 95 wt % of (a) a polyester resin and 5 to 40 wt % of (b) an olefin-based resin, and 0.5 to 30 parts by weight of (c) one or more resins selected from polyphenylene sulfide resins and liquid crystal resins, wherein said olefin-based resin (b) is composed of (b-1) a functional group-containing olefin copolymer having at least one kind of functional groups selected from carboxylic acid groups, carboxylic anhydride groups, carboxylic ester groups, metal carboxylate groups and epoxy groups and (b-2) an ethylene/α-olefin copolymer obtained by copolymerizing ethylene and an a-olefin with 3 to 20 carbon atoms; and the polyester resin (a) forms a continuous phase, while the olefin-based resin (b) is dispersed as particles with an average particle size of 0.01 to 2 μm in the composition. This invention provides a polyester resin composition having excellent flexibility and impact resistance in a low-temperature atmosphere, also having excellent flowability and chemicals resistance, and suitable for injection molding.

8 Claims, 1 Drawing Sheet

U.S. PATENT DOCUMENTS

| | | | |
|---|---|---|---|
| 5,219,941 A | 6/1993 | Meyer et al. | |
| 6,221,962 B1 * | 4/2001 | Heino et al. | 525/133 |
| 6,380,792 B1 * | 4/2002 | Yamamoto | 327/390 |
| 6,660,796 B2 | 12/2003 | Schueler et al. | |
| 2002/0091196 A1 | 7/2002 | Mori et al. | |

FOREIGN PATENT DOCUMENTS

| | | |
|---|---|---|
| JP | 62218442 A * | 9/1987 |
| JP | 01 190752 | 7/1989 |
| JP | 11189640 A * | 7/1999 |
| JP | 2000053847 A * | 2/2000 |
| WO | WO 93/24574 | 12/1993 |
| WO | WO 200127204 A1 * | 4/2001 |

OTHER PUBLICATIONS

PPS processing data sheet.*
The PDF files of JP 11189640 A and JP 2000053847 each contain both the Japanese document and an English translation of the abstract.*
English translation of abstract of JP 62218442A Sep. 1987.*
PPS processing data sheet Mar. 19, 2008.*
The PDF file of JP 2000053847 contains both the Japanese document and an English translation of the abstract Feb. 2000.*

* cited by examiner

POLYESTER RESIN COMPOSITION

TECHNICAL FIELD

This disclosure relates to a polyester resin composition having excellent mechanical properties, especially excellent flexibility and impact properties in a low temperature atmosphere as low as −40° C. and also having excellent chemicals resistance and flowability.

BACKGROUND

Polyester resins typified by polyethylene terephthalate and polybutylene terephthalate are used as various electric and electronic parts, mechanical parts, automobile parts, etc., since they have excellent properties.

However, since polyester resins are inferior in impact properties, especially notched impact strength, many proposals have been proposed for improving them. Among them, methods of blending a copolymer obtained from such monomers as an α-olefin and an α,β-unsaturated acid glycidyl ester are popularly used. The molded parts obtained by these methods show good impact properties at near room temperature but have a problem that they considerably decline in impact properties, for example, in a low temperature atmosphere of about −40° C. So, means for improving the impact properties at low temperature are disclosed, and they include a method of adding a specific glycidyl group-containing olefin copolymer and an ethylene/α-olefin copolymer (U.S. Pat. No. 4,461,871, US2002/91196), a method of adding an ethylene-vinyl acetate-based copolymer (U.S. Pat. No. 5,219,941), a method of adding an impact properties ingredient having an acid anhydride group and a specific glycidyl group-containing olefin copolymer (U.S. Pat. No. 6,660,796), etc. A means in which an impact properties improving material is added to a polyester resin and polyphenylene sulfide resin for enhancing impact properties is also disclosed (JP6-23300B).

However, even if these proposed conventional methods are used, any composition having an impact strength of 500 J/m or more in a low temperature atmosphere cannot be obtained. So, it is demanded to develop a material satisfying higher low-temperature properties. Furthermore, since the compositions obtained by these prior art are not satisfactory in the chemicals resistance against acids, alkalis and organic solvents, they are limited in applicability. Improvement in this regard is also desired.

It could therefore be advantageous to obtain a polyester resin composition having more excellent flexibility and impact properties in a low-temperature atmosphere than the conventional materials and also having excellent flowability and chemicals resistance.

SUMMARY

We found that a resin composition consisting of a polyester resin, a specific olefin-based resin, and a polyphenylene sulfide resin or a liquid crystal resin, in which a specific morphology is formed.

That is, We provide a polyester resin composition comprising 100 parts by weight of a resin composition consisting of 60 to 95 wt % of (a) a polyester resin and 5 to 40 wt % of (b) an olefin-based resin, and 0.5 to 30 parts by weight of (c) one or more resins selected from polyphenylene sulfide resins and liquid crystal resins, wherein said olefin-based resin (b) is composed of (b-1) a functional group-containing olefin copolymer having at least one kind of functional groups selected from carboxylic acid groups, carboxylic anhydride groups, carboxylic ester groups, metal carboxylate groups and epoxy groups and (b-2) an ethylene/α-olefin copolymer obtained by copolymerizing ethylene and an α-olefin with 3 to 20 carbon atoms; and the polyester resin (a) forms a continuous phase, while the olefin-based resin (b) is dispersed as particles with an average particle size of 0.01 to 2 μm in the composition.

BRIEF DESCRIPTION OF THE DRAWINGS

Meaning of symbols:
1. Polyester resin
2. Olefin-based resin

DETAILED DESCRIPTION

The polyester resin (a) is a polymer having ester bonds in its main chain. It can be suitably a thermoplastic polyester having aromatic rings in the chain units of the polymer. Particularly it can be a polymer or copolymer obtained by a condensation reaction usually with an aromatic dicarboxylic acid (or any of its ester forming derivatives) and a diol (or any of its ester forming derivatives) and/or a hydroxycarboxylic acid as main ingredients.

Examples of the aromatic dicarboxylic acid include terephthalic acid, isophthalic acid, orthophthalic acid, 2,6-naphthalenedicarboxylic acid, 1,5-naphthalenedicarboxylic acid, bis (p-carboxyphenyl)methane, anthracenedicarboxylic acid, 4,4'-diphenyldicarboxylic acid, 1,2-bis(phenoxy)ethane-4, 4'-dicarboxylic acid, 5-sodium sulfoisophthalic acid and their ester forming derivatives. Two or more of these aromatic dicarboxylic acids can also be used together. Furthermore, aliphatic dicarboxylic acids such as adipic acid, sebacic acid, azelaic acid and dodecanedioic acid, alicyclic dicarboxylic acids such as 1,3-cyclohexanedicarboxylic acid and 1,4-cyclohexanedicarboxylic acid, and their ester forming derivatives can also be used together.

Examples of the diol include aliphatic diols with 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, and cyclohexanediol, and their ester forming derivatives. Two or more of these diols can also be used together.

Examples of the polyester preferably usable in this invention include polyalkylene terephthalates such as polyethylene terephthalate, polypropylene terephthalate, polybutylene terephthalate, polycyclohexanedimethylene terephthalate, and polyhexylene terephthalate, polyethylene-2,6-naphthalene dicarboxylate, polybutylene-2,6-naphthalene dicarboxylate, polyethylene-1,2-bis(phenoxy)ethane-4,4'-dicarboxylate, and furthermore non-liquid crystalline polyesters such as polyethylene isophthalate/terephthalate, polybutylene isophthalate/terephthalate, polybutylene terephthalate/decanedicarboxylate, poly(ethylene terephthalate/cyclohexanedimethylene terephthalate), and polyethylene-4,4'-dicarboxylate/terephthalate, and their mixtures. More preferred are polyethylene terephthalate, polybutylene terephthalate, and polyethylene-2,6-naphthalene dicarboxylate. Especially preferred is polyethylene terephthalate. Using these polyester resins as a mixture is also practically suitable, depending on such required properties as moldability, heat resistance, toughness and surface properties.

The method for producing the polyester resin (a) is not especially limited, and a publicly known conventional direct polymerization or ester interchange method can be used for producing it.

The polymerization degree of the polyester resin is not limited, but it is preferred that, for example, the intrinsic viscosity measured in 0.5% o-chlorophenol solution at 25° C. is in a range from 0.35 to 2.00. A more preferred range is from 0.50 to 1.50, and an especially preferred range is from 0.50 to 1.20.

Furthermore, it is preferred that the amount of carboxyl end groups of the polyester resin (a) per ton of the polymer, obtained by potentiometric titration of its m-cresol solution using an alkali solution, is as relatively large as 30 to 80 eq/t in view of exhibited low-temperature impact properties. A more preferred range of the amount of the car-boxyl end groups is from 35 to 75 eq/t, and an especially preferred range is from 40 to 70 eq/t. It is not preferred that the amount of carboxyl end groups is smaller than 30 eq/t, since low-temperature properties tend to decline, and it is not preferred either that the amount is larger than 80 eq/t, since hydrolysis resistance tends to decline.

Next, the olefin-based resin (b) consists of a functional group-containing olefin copolymer (b-1) and an ethylene/α-olefin copolymer (b-2).

The functional group-containing olefin copolymer (b-1) is an olefin copolymer having at least one kind of functional groups selected from carboxylic acid groups, carboxylic anhydride groups, carboxylic ester groups, metal carboxylate groups and epoxy groups. In this case, the olefin copolymer having functional groups can be obtained by in-troducing a monomer as a component having at least one functional group selected from a carboxylic acid group, carboxylic anhydride group, carboxylic ester groups, metal carboxylate group and epoxy group, into an olefin copolymer. used for producing it.

The monomer as a component having a functional group used for introducing functional groups into the olefin copolymer is a compound containing a carboxylic acid group, carboxylic anhydride group, carboxylic ester groups, epoxy group, etc. Examples of the monomer as a component having a functional group include unsaturated dicarboxylic acids such as acrylic acid, methacrylic acid, maleic acid, fumaric acid, tetrahydrophthalic acid, itaconic acid, citraconic acid, crotonic acid, isocrotonic acid, norbornenedicarboxylic acid, and bicycle[2,2,1]hepto-2-ene-5,6-dicarboxylic acid, and their carboxylic anhydrides, carboxylates, etc. Particular examples of the compound include maleic anhydride, itaconic anhydride, citraconic anhydride, tetra-hydrophthalic anhydride, bicycle[2,2,1]hepto-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicycle[2,2,1]hepto-2-ene-5,6-dicarboxylate, hydroxyethyl acrylate, hydroxyethyl methacrylate, hydroxypropyl acrylate, propyl methacrylate, glycidyl acrylate, glycidyl methacrylate, glycidyl ethacrylate, glycidyl itaconate, glycidyl citraconate, aminoethyl methacrylate, aminopropyl methacrylate, etc.

The method for introducing the monomer as a component having a functional group is not especially limited. Usable methods include a method in which the monomer as a component having a functional group is copolymerized together with at least one olefin selected from ethylene and α-olefins, and a method in which the monomer is graft-introduced into an olefin-based polymer.

As at least one olefin selected from ethylene and α-olefins used in the copolymerization, it is preferred to use an olefin selected from ethylene and x-olefins with 3 to 20 carbon atoms. Examples of the olefin include ethylene and other olefins such as propylene, 1-butene, 2-butene, 1-pentene, 3-methyl-1-butene, 1-hexene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene, and 1-eicocene. Among them, one or more olefins selected from ethylene, propylene, 1-butene, 4-methyl-1-pentene, 1-hexene, and 1-octent are preferred.

Examples of the olefin-based polymer into which the monomer as a component having a functional group is graft-introduced include high density polyethylene, medium density polyethylene, low density polyethylene, polypropylene, ethylene/propylene copolymer, ethylene/butene-1 copolymer, ethylene/hexene-1 copolymer, ethylene/propylene/dicyclopentadiene copolymer, ethylene/propylene/5-ethylidene-2-norbornene copolymer, non-hydrogenated or hydrogenated styrene/isoprene/styrene triblock copolymer, non-hydrogenated or hydrogenated styrene/butadiene/styrene triblock copolymer, etc.

Moreover, in the case where the monomer as a component having a functional group is graft-introduced into the olefin-based polymer, it is preferred that the graft introduction is performed in the presence of a radical initiator, since the graft reaction efficiency can be enhanced. The radical initiator used here can be an organic peroxide or azo compound, etc. Examples of the radical initiator include dicumyl peroxide, di-t-butyl peroxide, 2,5-dimethyl-2,5-bis(t-butylperoxy)hexane, 2,5-dimethyl-2,5-bis(t-butylperoxy)hexyne-3,1,3-bis(t-butylperoxyisopropyl)benzene, 1,1-bis(t-butylperoxy)valerate, benzoyl peroxide, t-butylperoxy benzoate, acetyl peroxide, isobutyryl peroxide, octanoyl peroxide, decanoyl peroxide, lauroyl peroxide, 3,5,5-tri-methylhexanoyl peroxide, 2,4-dichlorobenzoyl peroxide, m-toluoyl peroxide, etc. Furthermore, examples of the azo compound include azoisobutyronitrile, dimethyl azoisobutyronitrile, etc.

The reaction condition of the above-mentioned graft reaction is not especially limited, but it is preferred that the reaction is performed with the olefin-based polymer kept molten. That is, the graft polymerization reaction is performed at a temperature higher than the melting point of said olefin copolymer, particularly usually in a range from 80 to 300° C., preferably in a range from 80 to 260° C.

Furthermore, the olefin copolymer having metal carboxylate groups is an olefin co-polymer obtained by partially or wholly converting the carboxylic acid introduced as described above into a metal salt. The metal in the metal carboxylate groups is not especially limited. Examples of the metal include alkali metals and alkaline earth metals such as Li, Na, K, Mg, Ca, Sr and Ba, and also Al, Sn, Sb, Ti, Mn, Fe, Ni, Cu, Zn, Cd, etc. Especially Zn can be preferably used.

It is preferred that the amount of the monomer component containing a functional group is from 0.001 to 40 mol % based on the total amount of the functional group-containing olefin copolymer (b-1). A more preferred range is from 0.01 to 35 mol %.

As the functional group-containing olefin copolymer (b-1), an olefin copolymer containing epoxy groups is preferred. The olefin copolymer containing epoxy groups means an olefin copolymer containing at least one epoxy group in the molecule. Preferred is any of olefin copolymers obtained by using ethylene andlor an α-olefin and an α,β-unsaturated car-boxylic acid glycidyl ether as comonomers. These copolymers can also be further copolymerized with an α,β-unsaturated carboxylic acid or any of its alkyl esters such as acrylic acid, methyl acrylate, ethyl acrylate, butyl acrylate, methacrylic acid, methyl methacrylate, ethyl meth-acrylate or butyl methacrylate.

It is especially preferred to use an olefin copolymer obtained by using ethylene and an α,β-unsaturated carboxylic acid glycidyl ester as comonomers. More particularly it is especially preferred to use an olefin copolymer obtained by using 60 to 99 wt % of ethylene and 1 to 40 wt % of an α,β-unsaturated carboxylic acid glycidyl ester as comonomers.

Said α,β-unsaturated carboxylic acid glycidyl ester is a compound represented by (where R denotes a hydrogen atom or lower alkyl group). Examples of it include glycidyl acry-late, glycidyl methacrylate, glycidyl ethacrylate, etc. Among them, glycidyl methacrylate can be preferably used.

Examples of the olefin copolymer obtained by using ethylene and/or an α-olefin and an α,β-unsaturated carboxylic acid glycidyl ester as essential comonomers include ethylene/propylene/glycidyl methacrylate copolymer, ethylene/butene-1/glycidyl methacrylate copolymer, ethylene/glycidyl acrylate copolymer, ethylene/glycidyl methacrylate copolymer, ethylene/methyl acrylate/glycidyl methacrylate copolymer, and ethylene/methyl methacrylate/glycidyl methacrylate copolymer. Among them, ethylene/glycidyl methacrylate copolymer, ethylene/methyl acrylate/glycidyl methacrylate copolymer, and ethylene/methyl methacrylate/glycidyl methacrylate copolymer can be preferably used.

Furthermore, the ethylene/a-olefin copolymer (b-2) obtained from ethylene and an α-olefin with 3 to 20 carbon atoms is a copolymer consisting of ethylene and one or more α-olefins with 3 to 20 carbon atoms as components. Examples of the α-olefin with 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetra-decene, and their combinations. Among these α-olefins, a copolymer obtained by using an α-olefin with 6 to 12 carbon atoms is preferred, since a higher impact strength and a further higher reforming effect can be achieved.

It is preferred that the melt flow rate (hereinafter abbreviated as MFR: measured according to ASTM D 1238 at 190° C. at 2160 g load) of the olefin-based resin (b) is from 0.01 to 70 g/10 mm. A more preferred range is from 0.03 to 60 g/10 mm. It must be noted that if MFR is less than 0.01 g/10 min flowability becomes low, and that if it is more than 70 g/10 min, the impact strength may decline, depending on the form of the molded part.

The method for producing the olefin-based resin (b) is not especially limited. Any method selected from radical polymerization, coordination polymerization using a Ziegler Natta catalyst, anionic polymerization, coordination polymerization using a metallocene catalyst, etc. can be used.

The mixing ratio of the polyester resin (a) and the olefin-based resin (b) of this invention is 60 to 95 wt % of the polyester resin and 5 to 40 wt % of the olefin-based resin. A preferred ratio is 70 to 85 wt % of the polyester resin and 15 to 30 wt % of the olefin-based resin. It is not preferred that the amount of the olefin-based resin is smaller than 5 wt %, since it is difficult to obtain the effect of improving flexibility and impact properties. It is not preferred either that the amount is larger than 40 wt % on the contrary, for such reasons that the thermal stability and chemicals resistance peculiar to the polyester resin are impaired and that the viscosity during melt kneading becomes large.

Moreover, it is preferred that the ratio of the functional group-containing olefin copolymer (b-1) to the ethylene/α-olefin copolymer (b-2) is such that the amount of the ingredient (b-1) is from 5 to 40 wt % while the amount of the ingredient (b-2) is from 60 to 95 wt % based on the total amount of both. It is more preferred that the amount of the ingredient (b-1) is from 10 to 30 wt % while the amount of the ingredient (b-2) is from 70 to 90 wt %. If the amount of the ingredient (b-1) is smaller than 5 wt %, it tends to be difficult to obtain low-temperature properties. If the amount is larger than 40 wt %, the viscosity during melt kneading tends to be so large as to lower the flowability. Furthermore, if the amount of the ingredient (b-2) is smaller than 60 wt %, it tends to be difficult to obtain low-temperature properties, and if the amount is larger than 95 wt %, the chemicals resistance tends to decline.

To further improve chemicals resistance and imparting such properties as flowability during processing without impairing the toughness and impact properties at low temperature, it is necessary to let the polyester resin composition contain one or more resins (c) selected from polyphenylene sulfide resins (hereinafter abbreviated as PPSs) and liquid crystal resins.

As the PPS (c), a polymer having recurring units represented by the following structural formula can be used.

In view of heat resistance, a polymer containing 70 mol % or more, especially 90 mol % or more of the recurring units represented by said structural formula is preferred. Furthermore, the PPS can contain less than about 30 mol % of recurring units having any of the following structures, etc. Above all, for example, p-phenylene sulfide/m-phenylene sulfide copolymer (containing 20% or less of m-phenylene sulfide units) can be preferably used, since it has both moldability and barrier properties.

Such a PPS can be produced at a high yield by recovering and post-treating the PPS obtained by letting a polyhalogen aromatic compound and a sulfidizing agent react with each other in a polar organic solvent. Concretely it can also be produced by the method of obtaining a polymer with a relatively low molecular weight described in JP45-3368B, or the method of obtaining a polymer with a relatively high molecular weight described in JP52-12240B or JP61-7332A, etc. The PPS obtained as described above can also be variously treated, for example, by heating in air for crosslinking/increasing its molecular weight, heat-treating in an inert gas atmosphere such as nitrogen or under reduced pressure, washing with an organic solvent, hot water or acid aqueous solution, etc., activating using a functional group-containing compound such as an acid anhydride, amine, isocyanate, functional group-containing disulfide compound, before it is used.

The particular method for heating the PPS for crosslinking/increasing the molecular weight can be a method in which the PPS is heated in an oxidizing gas atmosphere such as air or oxygen or in a mixed gas atmosphere consisting of said oxidizing gas and an inert gas such as nitrogen or argon at a predetermined temperature in a heating vessel till a desired melt viscosity can be obtained. The heat treatment temperature is usually selected in a range from 170 to 280° C. A preferred range is from 200 to 270° C. Furthermore, the heat treatment time is usually selected in a range from 0.5 to 100 hours. A preferred range is from 2 to 50 hours. If both of them are controlled, the intended viscosity level can be obtained. The heat treatment apparatus can be an ordinary hot air dryer, a rotary heater or a heater with stirring blades. In view of efficient and more uniform treatment, it is preferred to use a rotary heater or a heater with stirring blades.

The particular method for heat-treating the PPS (c) in an inert gas atmosphere such as nitrogen or under reduced pressure can be a method in which the PPS is heat-treated in an insert gas atmosphere such as nitrogen or under reduced pressure at a heat treatment temperature of 150 to 280° C., preferably 200 to 270° C. for a heating time of 0.5 to 100 hours, preferably 2 to 50 hours. The heat treatment apparatus can be an ordinary hot air dryer, a rotary heater or a heater with stirring blades. However, in view of efficient and more uniform treatment, it is preferred to use a rotary heater or a heater with stirring blades.

It is preferred that the PPS (c) is a PPS treated with washing. Examples of the washing treatment method include acid aqueous solution washing treatment, hot water washing treatment, organic solvent washing treatment, etc. Two or more of these washing treatment methods can also be used in combination.

The particular method for washing the PPS with an organic solvent can be as exemplified below. The organic solvent used for washing the PPS is not especially limited if it does act on the PPS, for example, if it does not decompose the PPS. Examples of the organic solvent include nitrogen-containing polar solvents such as N-methylpyrrolidone, dimethylformamide and dimethylacetamide, sulfoxide-based and sulfo-based solvents such as dimethyl sulfoxide and dimethyl sulfone, ketone-based solvents such as acetone, methyl ethyl ketone, diethyl ketone and acetophenone, ether-based solvents such as dimethyl ether, dipropyl ether and tetrahydrofuran, halogen-based solvents such as chloroform, methylene chloride, trichloroethylene, ethylene dichloride, dichloroethane, tetrachloroethane and chlorobenzene, alcohol-based and phenol-based solvents such as methanol, ethanol, propanol, butanol, pentanol, ethylene glycol, propylene glycol, phenol, cresol and polyethylene glycol, aromatic hydrocarbon-based solvents such as benzene, toluene and xylene. Among these organic solvents, it is preferred to use N-methylpyrrolidone, acetone, dimethylformamide, chloroform, etc. Any one of these organic solvents can be used, or two or more of them can also be used as a mixture. The method for washing the PPS with an organic solvent can be, for example, a method in which the PPS is immersed in an organic solvent. As required, adequate stirring or heating can also be used. The washing temperature for washing the PPS with an organic solvent is not especially limited, and a desired temperature can be selected in a range from room temperature to about 300° C. If the washing temperature is higher, the washing efficiency tends to be higher, but usually a washing temperature in a range from room temperature to 150° C. assures a sufficient effect. Furthermore, it is preferred that the PPS washed with an organic solvent is washed with cold or warm water several times for removing the remaining organic solvent.

As the particular method for washing the PPS with hot water, the following method can be exemplified. To exhibit a preferred effect of chemically modifying the PPS by hot water washing, it is preferred that the water used is distilled water or deionized water. The operation of hot water treatment is usually performed by adding the PPS into a predetermined amount of water and heating and stirring at atmospheric pressure or in a pressure vessel. As for the ratio between PPS and water, it is preferred that the amount of water is larger. Usually the bath ratio is selected to ensure that 200 g or less of the PPS is added into 1 liter of water.

Moreover, in the case where the PPS is washed with hot water, it is preferred to use an aqueous solution containing a group II metal element of the periodic table for treatment. The aqueous solution containing a group II metal element of the periodic table is obtained by adding a water soluble salt of a group II metal element of the periodic table to said water. It is preferred that the concentration of the water soluble salt of a group II metal element of the periodic table based on the amount of water is in a range from about 0.001 to about 5 wt %.

Preferred examples of the metal element used among the group II metal elements of the periodic table include Ca, Mg, Ba, Zn, etc. Examples of the counter anions include acetate ions, halide ions, hydroxide ions, carbonate ions, etc. More particular and suitable examples of the compound include calcium acetate, magnesium acetate, zinc acetate, $CaCl_2$, $CaBr_2$, $ZnCl_2$, $CaCO_3$, $Ca(OH)_2$, CaO, etc. Especially preferred is calcium acetate.

It is preferred that the temperature of the aqueous solution containing a group II metal element of the periodic table is 130° C. or higher. More preferred is 150° C. or higher. The upper limit of the washing temperature is not especially limited. However, in the case where an ordinary autoclave is used, about 250° C. is the limit.

It is preferred that the bath ratio is selected to ensure that the ratio of (the weight of the dry polymer: the weight of the aqueous solution containing a group II metal element of the periodic table) is kept in a range from 1:2 to 1:100. A more preferred range is from 1:4 to 1:50, and a further more preferred range is from 1:5 to 1:15.

The particular method for washing the PPS with an acid aqueous solution is exemplified below. That is, for example, a method in which the PPS is immersed in an acid or an acid aqueous solution can be used, and as required, adequate stirring or heating can also be used. The acid used is not especially limited, if it does not act to decompose the PPS. Examples of the acid include aliphatic saturated monocarboxylic acids such as formic acid, acetic acid, propionic acid and butyric acid, halo-substituted aliphatic saturated carboxylic acids such as chloroacetic acid and dichloroacetic acid, aliphatic unsaturated monocarboxylic acids such as acrylic acid and crotonic acid, aromatic carboxylic acids such as benzoic acid and salicylic acid, dicarboxylic acids such as oxalic acid, malonic acid, succinic acid, phthalic acid and fumaric acid, inorganic acidic compounds such as sulfuric acid, phosphoric acid, hydrochloric acid, carbonic acid and silicic acid. Among them, acetic acid and hydrochloric can be more preferably used. It is preferred that the PPS treated with such an acid is washed with cold or warm water several times for removing the remaining acid, salt, etc. It is preferred that the water used for washing is distilled water or deionized water, lest the preferred effect of chemically modifying the PPS by the acid treatment should be impaired.

It is preferred that the ash content of the PPS (c) is in a relatively large range from 0.1 to 2 wt % for imparting the flowability during processing and properties such as fast molding cycles. A more preferred range is from 0.2 to 1 wt %, and a further more preferred range is from 0.3 to 0.8 wt %.

The ash content in this case refers to the amount of inorganic components in the PPS obtained by the following method.

(1) Five to six grams of the PPS are weighed and placed on a platinum dish burned at 583° C. and cooled.
(2) The PPS is preliminarily burned at 450 to 500° C. together with the platinum dish.
(3) The preliminarily burned PPS sample is placed in a muffle furnace set at 583° C. together with the platinum dish, and burned for about 6 hours till it is perfectly incinerated.
(4) It is cooled in a desiccator and weighed.
(5) The ash content is calculated from the following formula: Ash content (wt %)=(Weight of ash (g)/Weight of the sample (g))×100

It is preferred that the melt viscosity of the PPS (c) is in a range from 1 to 2000 Pa·s (300° C., shear rate 1000 $sec^{-1}$) in view of higher chemicals resistance and such properties as flowability during processing. A more preferred range is from 1 to 200 Pa·s, and a further more preferred range is from 1 to 50 Pa·s. The melt viscosity in this case is a value measured using a Koka type flow tester and a nozzle with a nozzle diameter of 0.5 mm and a nozzle length of 10 mm at a shear rate of 1000 $sec^{-1}$.

It is preferred that the chloroform extraction content (calculated from the amount remaining after 5-hour Soxhlet extraction of 10 g of the polymer using 200 mL of chloroform) as an indicator of the oligomer content of the PPS (c) is in a relatively large range from 1 to 5 wt % for improving the chemicals resistance and imparting such properties as flowability during processing. A more preferred range is from 1.5 to 4 wt %, and a further more preferred range is from 2 to 4 wt %.

The liquid crystal resin (c) is a resin capable of forming an anisotropic melt phase. It is preferred that the resin has ester bonds. The resin is, for example, a liquid crystal polyester composed of structural units selected from aromatic oxycarbonyl units, aromatic dioxy units, aromatic and/or aliphatic dicarbonyl units, alkylenedioxy units, etc. and capable of forming an anisotropic melt phase, or a liquid crystal polyester amide composed of said structural units and structural units selected from aromatic iminocarbonyl units, aromatic diimino units, aromatic iminoxy units, etc. and capable of forming an anisotropic melt phase.

The aromatic oxycarbonyl units can be structural units produced, for example, from p-hydroxybenzoic acid, 6-hydroxy-2-naphthoic acid, etc. The aromatic dioxy units can be structural units produced, for example, from 4,4'-dihydroxybiphenyl, hydroquinone, 3,3',5,5'-tetra-methyl-4,4'-dihydroxybiphenyl, t-butylhydroquinone, phenylhydroquinone, 2,6-dihydroxynaphthalene, 2,7-dihydroxynaphthalene, 2,2-bis(4-hydroxyphenyl)propane, 4,4'-dihydroxydiphenyl ether, etc. The aromatic and/or aliphatic dicarbonyl units can be structural units produced, for example, from terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, adipic acid, sebacic acid, etc. The alkylenedioxy units can be structural units produced, for example, from ethylene glycol, 1,3-propylene glycol, 1,4-butanediol (among them, structural units produced from ethylene glycol are preferred), etc. The aromatic iminoxy units can be structural units produced, for example, from 4-aminophenol, etc.

Examples of the liquid crystal polyester include a liquid crystal polyester composed of structural units produced from p-hydroxybenzoic acid and 6-hydroxy-2-naphthoic acid, a liquid crystal polyester composed of structural units produced from p-hydroxybenzoic acid, structural units produced from 6-hydroxy-2-naphthoic acid, and structural units produced from an aromatic dihydroxy compound and/or aliphatic dicarboxylic acid, a liquid crystal polyester composed of structural units produced from p-hydroxybenzoic acid, structural units produced from 4,4'-dihydroxybiphenyl, and structural units produced from aliphatic dicarboxylic acids such as terephthalic acid and/or adipic acid, and sebacic acid, a liquid crystal polyester composed of structural units produced from p-hydroxybenzoic acid, structural units produced from ethylene glycol, and structural units produced from terephthalic acid, a liquid crystal polyester composed of structural units produced from p-hydroxybenzoic acid, structural units produced from ethylene glycol, and structural units produced from terephthalic acid and isophthalic acid, a liquid crystal polyester composed of structural units produced from p-hydroxybenzoic acid, structural units produced from ethylene glycol, structural units produced from 4,4'-dihydroxy- biphenyl, and structural units produced from aliphatic dicarboxylic acids such as terephthalic acid and/or adipic acid, and sebacic acid, a liquid crystal polyester composed of structural units produced from p-hydroxybenzoic acid, structural units produced from ethylene glycol, structural units produced from an aromatic dihydroxy compound, and structural units produced from aromatic dicarboxylic acids such as terephthalic acid, isophthalic acid and 2,6-naphthalenedicarboxylic acid.

Above all, preferred examples of the liquid crystal polyester capable of forming an anisotropic melt phase include a liquid crystal polyester composed of structural units of (I), (II), (III) and (IV) represented by the following general formulae, a liquid crystal polyester composed of structural units of (I), (III) and (IV), etc.

Especially preferred is a liquid crystal polyester composed of structural units of (I), (II), (III) and (IV).

(where R₁ denotes at least one or more groups selected from the following general formulae:

R₂ denotes one or more groups selected from the following general formulae:

and X denotes a hydrogen atom or chlorine atom.)

The structural units (I) are structural units produced from p-hydroxybenzoic acid. The structural units (II) are structural units produced from one or more aromatic dihydroxy compounds selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane and 4,4'-dihydroxydiphenyl ether. The structural units (III) are structural units produced from ethylene glycol. The structural units (IV) are structural units produced from one or more aromatic dicarboxylic acids selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid and 4,4'-diphenyl ether dicarboxylic acid. Among them, structural units, in which R₁ denote the following formula and R₂ denotes the following formula are especially preferred.

The preferred liquid crystal polyester is, as described above, one or more selected from copolymers composed of structural units (I), (III) and (IV) and co-polymers composed of structural units (I), (II), (III) and (IV), and the amounts of said structural units (I), (II), (III) and (IV) copolymerized can be decided as desired. However, to exhibit the properties of this invention, it is preferred that the amounts of the respective structural units to be copolymerized are as follows.

In the case where the copolymer is composed of the structural units (I), (II), (III) and (IV), it is preferred that the total amount of the structural units (I) and (II) to be copolymerized is from 30 to 95 mol % based on the total amount of the structural units (I), (II) and (III) to be copolymerized. An especially more preferred range is from 40 to 85 mol %. Furthermore, it is preferred that the amount of the structural units (III) to be copolymerized is from 70 to 5 mol % based on the total amount of the structural units (I), (II) and (III) to be copolymerized. An especially more preferred range is from 60 to 15 mol %. Moreover, it is preferred that the molar ratio [(I)/(II)] of the structural units (I) to the structural units (II) is from 75/25 to 95/5. A more preferred range is from 78/22 to 93/7. Furthermore, it is preferred that the amount of the structural units (IV) to be copolymerized is substantially equimolar to the total amount of the structural units (II) and (III).

On the other hand, in the case where the copolymer does not contain the structural units (II), it is preferred that the amount of the structural units (I) to be copolymerized is from 40 to 90 mol % based on the total amount of the structural units (I) and (III) in view of flowability. An especially preferred range is from 60 to 88 mol %. It is preferred that the amount of the structural units (IV) to be copolymerized is substantially equimolar to the amount of the structural units (III) to be copolymerized.

In the above, being substantially equimolar means that the units of a component used in the main chain of a polymer excluding the ends are equimolar to the units of another component used in the main chain of the polymer excluding the ends, but that the units of a component used in the ends is not always equimolar to the units of another component used in the ends.

Furthermore, as the liquid crystal polyester amide, preferred is a polyester amide containing the p-iminophenoxy units produced from p-aminophenol in addition to the above-mentioned structural units (I) through (IV) and capable of forming an anisotropic melt phase.

The liquid crystal polyester and liquid crystal polyester amide can have any of the following compounds copolymerized as a component other than the components represented by said structural units (I) through (IV) to such an extent that the liquid crystallinity is not impaired: aromatic dicarboxylic acids such as 3,3'-diphenyldicarboxylic acid and 2,2'-diphenyldicar-boxylic acid, aliphatic dicarboxylic acids such as adipic acid, azelaic acid, sebacic acid and dodecanedioic acid, alicyclic dicarboxylic acids such as hexahydroterephthalic acid, aromatic diols such as chlorohydroquinone, 3,4'-dihydroxybiphenyl, 4,4'-dihydroxydiphenylsulfone, 4,4'-dihydroxydiphenyl sulfide, 4,4'-dihydroxybenzophenone and 3,4'-dihydroxybiphenyl, aliphatic and alicyclic diols such as propylene glycol, 1,4-butanediol, 1,6-hexanediol, neopentyl glycol, 1,4-cyclohexanediol and 1,4-cyclohexanedimethanol, aromatic hydroxycarboxylic acids such as m-hydroxybenzoic acid and 2,6-hydroxynaphthoic acid, p-aminobenzoic acid, etc.

The method for producing the liquid crystal resin (c) is not especially limited, and any publicly known polyester polycondensation method can be used for producing it.

Furthermore, the melt viscosity of the liquid crystal resin (c) is not especially limited. However, to exhibit the effects more remarkably, it is preferred that the value measured at the melting point of the liquid crystal resin +10° C. is 100 Pa·s or less. A more preferred range is from 0.1 to 50 Pa·s, and the most preferred range is from 0.5 to 30 Pa·s. Meanwhile, the melt viscosity is the value measured using a Koka type flow tester and a nozzle with a nozzle diameter of 0.5 mm and a nozzle length of 10 mm at a shear rate of 1000 sec$^{-1}$.

In this case, the melting point is obtained as described below. In the differential calorimetry, the endothermic peak temperature (Tm1) observed when the polymer is heated from room temperature at a heating rate of 20° C./min is identified, and the polymer is kept at a temperature of Tm1+20° C. for 5 minutes and once cooled to room temperature at a cooling rate of 20° C./min, then being heated at a heating rate of 20° C. again, to observe the endothermic peak temperature (Tm2) to be identified as the melting point.

The amount of one or more resins (c) selected from PPSs and liquid crystal resins, to be added to the composition consisting of the polyester resin (a) and the olefin-based resin (b) is from 0.5 to 30 parts by weight per 100 parts by weight as the total amount of (a) and (b), for further improving the chemicals resistance and imparting such properties as flowability during processing without impairing the toughness and impact properties at low temperature. A preferred range is from 1 to 30 parts by weight, and a more preferred range is from 1 to 20 parts by weight. A further more preferred range is from 2 to 20 parts by weight, and an especially preferred range is from 3 to 15 parts by weight. The most preferred range is from 5 to 15 parts by weight. If the amount of one or more resins (c) selected from PPSs and liquid crystal resins is too small, the effect of improving the chemicals resistance is small. If the amount is too large, the properties at low temperature tend to decline.

To the polyester resin composition, the antioxidant and other additives as described below can also be added.

To keep high heat resistance and thermal stability, it is preferred to let the polyester resin composition contain one or more antioxidants selected from phenol-based and phosphorus-based compounds. It is preferred that the amount of the antioxidant added is 0.01 part by weight or more, especially 0.02 part by weight or more per 100 parts by weight as total of the ingredients (a) and (b), in view of the effect of improving heat resistance. In view of the gas component generated during molding, it is preferred that the amount is 5 parts by weight or less, especially 1 part by weight or less. Furthermore, it is preferred to use a phenol-based antioxidant and a phosphorus-based antioxidant together, since the effects of keeping heat resis-tance, thermal stability and flowability are especially large.

As the phenol-based antioxidant, a hindered phenol-based compound can be preferably used. Examples of it include triethylene glycol bis[3-t-butyl(5-methyl-4-hydroxyphenyl)propionate], N,N'-hexamethylene bis(3,5-di-t-butyl-4-hydroxy-hydrocinnamide), tetrakis[meth-ylene-3-(3',5'-di-t-butyl-4'-hydroxyphenyl)propionate]methane, pentaerythrityl tetrakis[3-(3',5'-di-t-butyl-4'-hydroxyphenyl)propionate], 1,3,5-tris(3,5-di-t-butyl-4-hydroxybenzyl)-s-triazine-2,4,6-(1H,3H,5H)-trione, 1,1,3-tris(2-methyl-4-hydroxy-5-t-butylphenyl)butane, 4,4'-butyliden-bis(3-methyl-6-t-butylphenol), n-octadecyl-3-(3,5-di-t-butyl-4-hydroxyphenyl)propionate, 3,9-bis[2-(3-(3-t-butyl-4-hydroxy-5-methylphenyl)propionyloxy)-1,1-dimethylethyl]-2,4,8,10-tetra-oxaspiro[5,5]undecane, 1,3,5-trimethyl-2,4,6-tris-(3,5-di-t-butyl-4-hydroxybenzyl)benzene, etc.

Above all, an ester type high molecular hindered phenol-based compound is preferred. Particularly, tetrakis[methylene-3-(3',5'-di-t-butyl-4'-hydroxyphenyl)propionate]methane, pentaerythrityl tetrakis[3-(3',5'-di-t-butyl-4'-hydroxyphenyl)propionate], 3,9-bis[2-(3-(3-t-butyl-4-hydroxy-5-methylphenyl)propionyloxy)-1,1-dimethylethyl]-2,4,8,10-tetraoxaspiro[5,5]undecane, etc. can be preferably used.

Examples of the phosphorus-based antioxidant include bis (2,6-di-t-butyl-4-methyl-phenyl)pentaerythritol-di-phosphite, bis(2,4-di-t-butylphenyl)pentaerythritol-di-phosphite, bis(2,4-di-cumylphenyl)pentaerythritol-di-phosphite, tris(2, 4-di-t-butylphenyl)phosphite, tetrakis(2,4-di-t-butylphenyl)-4,4'-bisphenylene phosphite, di-stearylpentaerythritol-di-phosphite, triphenyl phosphite, 3,5-di-butyl-4-hydroxybenzyl-phosphonate diethyl ester, etc.

Above all, to decrease the volatilization and decomposition of the antioxidant in the compound of the polyester resin, an antioxidant with a high melting point is preferred. Particularly, bis(2,6-di-t-butyl-4-methylphenyl)pentaerythritol-di-phosphite, bis(2,4-di-t-butylphenyl)pentaerythritol-di-phosphite, bis(2,4-di-cumylphenyl)pentaerythritol-di-phosphite, etc. can be preferably used.

Furthermore, to the polyester resin composition, a resin other than the olefin-based resin can be added to such an extent that desirable effects are not impaired. For example, if a small amount of a highly crystalline thermoplastic resin is added, moldability can be improved. However, it is not preferred that the amount of the thermoplastic resin corresponds to more than 30 wt % of the entire composition, since the features peculiar to the polyester resin are impaired. Especially it is preferred that the amount added corresponds to 20 wt % or less. Examples of the thermoplastic resin include a polyamide resin, modified poly-phenylene ether resin, polysulfone resin, polyallyl sulfone resin, polyketone resin, poly-etherimide resin, polyarylate resin, polyethersulfone resin, polyetherketone resin, polythio-etherketone resin, polyetheretherketone resin, polyimide resin, polyamideimide resin, poly-ethylene tetrafluoride resin, etc. Furthermore, for the purpose of modification, the following compounds can be added. It is possible to add a coupling agent such as an isocyanate-based compound, organic silane-based compound, organic titanate-based compound, organic borane-based compound or epoxy compound, a plasticizer such as a polyalkylene oxide oligomer-based compound, thioether-based compound, ester-based compound or organic phosphorus-based compound, a crystal nucleating agent such as talc, kaolin, organic phosphorus compound or polyetheretherketone, a metal soap such as montanic acid wax, lithium stearate or aluminum stearate, a releasing agent such as ethylenediamine/stearic acidisebacic acid polycondensation product or silicone-based compound, a color protection agent such as a hypophosphite, and other ordinary additives such as a lubricant, ultraviolet inhibitor, coloring agent, flame retarder and foaming agent. It is not preferred that the amount of any of the above-mentioned compounds exceeds 20 wt % of the entire composition, since the properties peculiar to the polyester resin are impaired. Preferred is 10 wt % or less, and more preferred is 1 wt % or less.

A filler can also be added to the polyester resin composition obtained by the method to such an extent that the effects are not impaired. Examples of the filler include fibrous fillers such as glass fibers, carbon fibers, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metal fibers, non-fibrous fillers, for example, silicates such as talc, wollas-tonite, zeolite, sericite, mica, kaolin, clay, pyrophyllite, bentonite, asbestos and alumina silicate, metal compounds such as silicon oxide, magnesium oxide, alumina, zirconium oxide, titanium oxide and iron oxide, carbonates such as calcium carbonate, magnesium carbonate and dolomite, sulfates such as calcium sulfate and barium sulfate, hydroxides such as calcium hydroxide, magnesium hydroxide and aluminum hydroxide, glass beads, glass flakes, glass powder, ceramic beads, boron nitride, silicon carbide, carbon black, silica, graphite, etc. They can also be hollow, and two or more of these fillers can also be used together. Furthermore, any of these fillers can also be pretreated with a coupling agent such as an isocyanate-based compound, organic silane-based compound, organic titanate-based compound, organic borane-based compound or epoxy compound, before it is used.

Figure 1:
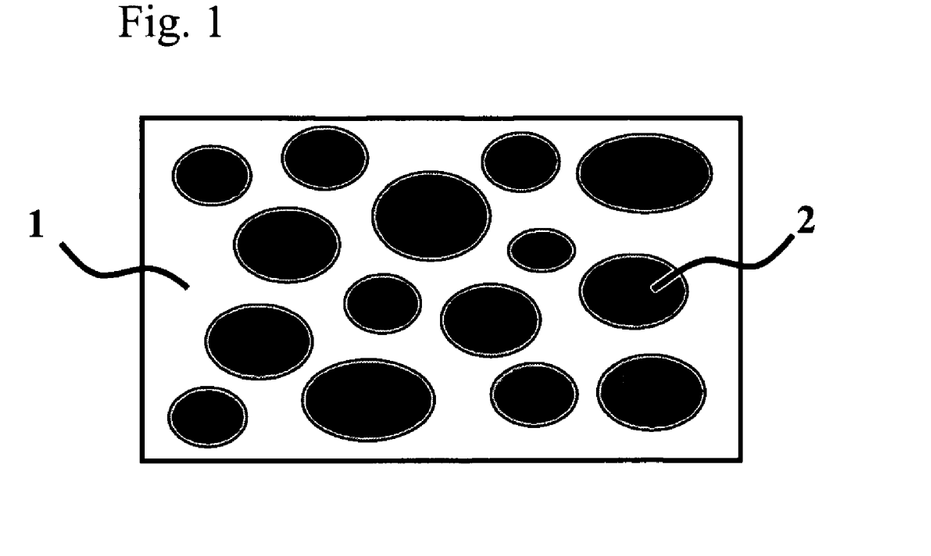
FIG. 1 is a model drawing showing a sea-island structure in which a polyester resin forms a continuous phase while an olefin-based resin is dispersed.

It is necessary that the polyester resin composition has a morphology in which the polyester resin 1 forms a continuous phase (matrix) while the olefin-based resin 2 forms a dispersion phase (sea-island structure) as shown in FIG. 1, and that the average particle size of the olefin-based resin forming the dispersion phase is from 0.01 to 2 μm, preferably from 0.01 to 1 μm, in order to achieve a high balance between flexibility and impart properties at low temperature. In this regard, the morphology of the polyester resin composition of this invention is not limited to that of FIG. 1. The form of the olefin-based resin particles can be non-circular, for example, polygonal or virtually ellipsoidal. If the dispersed particles of the olefin-based resin cohere to each other to form particles with an average particle size of more than 2 μm, the polyester resin conmosition is unlikely to have good low-temprature properties and tends to decline in chemicals resistance. Furthermore, in the case where the polyester does not form a continuous phase, the polyester resin composition declines in flowablity and chemicals resistance. In the case where the polyester resin composition has the above-mentioned morphology, it is excellent in low-temperature properties and especially excellent in chemicals resistance and flowability.

The average particle size of the olefin-based resin in this case is obtained as described below. An ASTM Type 1 dumbbell specimen is obtained by molding the polyester resin composition, and is cut in the sectional area direction of the dumbbell specimen at its central portion, to obtain a thin section of 0.1 μm or less. It is observed with a transmission electron microscope (magnification 10,000-fold), and the maximum diameters and the minimum diameters of given 100 dispersed particles of the olefin-based resin are measured. The maximum diameters and the minimum diameters are averaged to obtain mean values which are further averaged to obtain a number average particle size.

Furthermore, in the polyester resin composition, it is preferred that the PPS resin or liquid crystal resin (c) is dispersed as particles with an average particle size of 1 to 100 nm in the polyester resin phase. A more preferred range is from 1 to 80 nm, and the most preferred range is from 1 to 50 nm. If the polyester resin composition has this morphology, it has especially excellent chemicals resistance. If it has a structure in which the PPS resin or liquid crystal resin (c) is very finely and uniformly dispersed, the chemicals resistance of the polyester resin can be dramatically improved. To form the fine and uniform dispersion structure, it is preferred that the amount of the carboxyl end groups of the polyester resin (a) is in a range from 30 to 80 eq/t. Moreover, in the case where the PPS resin is used as the ingredient (c), it is preferred that the ash content, melt viscosity and chloroform extraction content of the PPS resin are in the above-mentioned specific ranges.

It is preferred that the weight reduction rate of the polyester resin composition after it has been immersed in 23° C. hexafluoroisopropanol (hereinafter abbreviated as HFIP) for 1 hour is from 0 to 5%. It is not preferred that the weight reduction rate is larger than 5%, since the polyester resin composition cannot be used in any application requiring a contact with a chemical solution, since it is low in chemicals resistance. Furthermore, it is preferred that the tensile break elongation measured at a temperature of −40° C. according to ASTM-D638 is from 20 to 400%, and that the notched impact strength measured according to ASTM-D256 is from 500 to 2000 J/m. It is more preferred that the tensile break elongation is from 30 to 400%, and that the notched impact strength is from 600 to 2000 J/m. It is not preferred that the respective properties do not conform to the above-mentioned ranges, since the use in a cold area or in a low temperature environment is limited.

It is preferred that the exothermic peak temperature (Tmc) of the polyester resin composition observed during cooling from 300° C. at a cooling rate of 20° C./min in differential calorimetry is from 190 to 220° C. in the case where polyethylene terephthalate is used as the polyester resin (a). A more preferred range is from 195 to 220° C. In this case, the moldability and fast molding cycles in injection molding can be improved.

As a typical method for producing the polyester resin composition, the raw materials can be fed into a melt kneading machine such as a single-screw or twin-screw extruder, Banbury mixer, kneader or mixing roll mill, and are kneaded at a processing temperature higher than the melting point of the polyester resin. For controlling the morphology of this invention and the particle size of the olefin-based resin (b) as described above, it is necessary to keep the shearing force relatively high. Furthermore, it is necessary to keep the residence time during kneading short. If these conditions are combined, the polyester resin can be made to form a continuous phase while the cohesion of the olefin-based resin is prevented. Particularly it is preferred that a twin-screw extruder is used, that the kneading temperature is the melting point of the polyester resin +5 to 20° C., and that the residence time is from 1 to 5 minutes. In this case, the order of mixing raw materials is not especially limited. In one method, all the raw materials can be mixed and melt-kneaded by the above-mentioned method. In another method, some raw materials can be mixed and melt-kneaded by the above-mentioned method, and further the remaining raw materials can be mixed, the mixture being melt-kneaded. In a further other method, some raw materials can be mixed, and while they are melt-kneaded by a single-screw or twin-screw extruder, the remaining raw materials can be mixed using a side feeder. Any one of these and other methods can be used. Moreover, for minor ingredients, the following method can also be employed. After the other ingredients have been kneaded and pelletized by the above-mentioned method or the like, they are added before molding, so that the entire mixture can be molded The polyester resin composition is especially useful for an application as injection-molded parts, since it is excellent in impact properties and flowability. It is especially suitable for use as structural materials such as pipes and cases for general apparatuses and motor vehicles, molded parts with metallic inserts for electric and electronic use, etc.

Our resins are described below more particularly in reference to examples since they have excellent flexibility and impact properties in low temperature atmosphere and also has excellent flowability and chemicals resistance.

[Amount of Carboxyl End Groups]

A polyester resin was dissolved in m-cresol, and the potentiometric titration of the m-cresol solution was carried out using an alkali solution. The amount of carboxyl end groups was expressed as an amount per ton of the polymer.

[Observation of Morphology]

Figure 2:
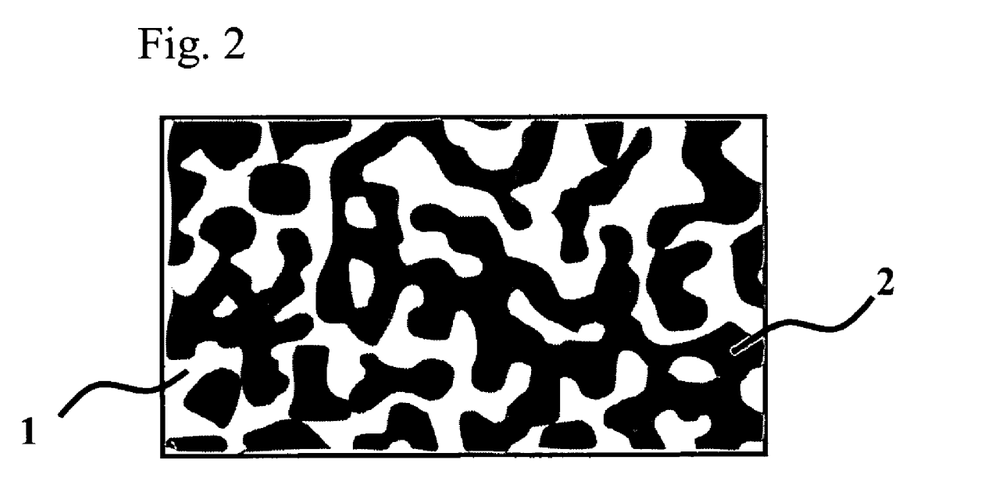
FIG. 2 is a model drawing showing a co-continuous phase structure in which a poly-ester resin and an olefin-based resin form continuous phases together.

An injection molding machine (SG75H-MIV produced by Sumitomo Heavy Industries, Ltd., cylinder temperature 280° C., mold temperature 130° C.) was used to injection-mold a polyester resin composition, for obtaining an ASTM Type 1 dumbbell specimen. From its central portion, a thin section of 0.1 µm or less was obtained by cutting and observed using a transmission electron microscope. The morphology was evaluated according to the following criterion:

A: The polyester resin forms a continuous phase while the olefin-based resin forms a dispersion phase, as shown in FIG. 1.
    B: The polyester resin and the olefin-based resin form a co-continuous phase as shown in FIG. 2.

[Average Particle Size]

For measuring the average particle size of an olefin-based resin, as in the above-mentioned observation of morphology, a thin section of a specimen obtained by injection molding was observed using a transmission electron microscope at a magnification of 10,000 times. The maximum diameters and the minimum diameters were measured using image processing software "Scion Image" and their mean values were obtained for 100 dispersed particles of the olefin-based resin. Then, the 100 mean values were further number-averaged, and the obtained value was defined as the average particle size. Furthermore, the particle sizes of the dispersed particles of the PPS or liquid crystal resin were obtained similarly, except that they were observed at a magnification of 100,000 times.

[Lower Limit Pressure of Molding]

An injection molding machine (SG75H-MIV produced by Sumitomo Heavy Industries, Ltd., cylinder temperature 280° C., mold temperature 130° C.) was used to injection-mold a polyester resin composition, for preparing a specimen. The lowest filling pressure in this case was measured. However, in the case where polybutylene terephthalate resin was used as the polyester resin, the cylinder temperature was set at 260° C. and the mold temperature, 80° C.

[−40° C. impact strength]

A polyester resin composition was injection-molded as described above, to prepare a specimen for impact strength specified in ASTM-D256. The notched impact strength (⅛ inch thickness) was measured according to ASTM-D256, except that the measuring temperature in the atmosphere was −40° C.

[−40° C. Tensile Break Elongation]

A polyester resin composition was injection-molded as described above, to obtain an ASTM Type 1 dumbbell specimen. The tensile break elongation (⅛ inch thickness) was measured according to ASTM-D638, except that the temperature in the atmosphere was −40° C.

[Chemicals Resistance]

An ASTM Type 1 dumbbell specimen was immersed in toluene of 60° C. for 24 hours, and after completion of immersion, the surface of the dumbbell specimen was observed with an optical microscope to see whether or not the surface was roughened partially (voids, etc.).

A: There were few surface roughened portions.
    B: Surface roughened portions accounted for 30% or less.
    C: Surface roughened portions accounted for about 50%.
    D: Surface roughened portions accounted for 100%.
    E: The olefin-based resin dissolved out.

[HFIP Resistance]

An ASTM Type 1 dumbbell specimen was immersed in hexafluoroisopropanol (HFIP) of 23° C. for 1 hour. It was weighed before and after immersion, to calculate the weight reduction rate.

$$\text{Weight reduction rate} = [(\text{Weight before immersion treatment}) - (\text{Weight after immersion treatment}) \div \text{Weight before immersion treatment}] \times 100\ [\%]$$

[Hydrolysis Resistance]

An ASTM Type 1 dumbbell specimen was treated at a constant temperature of 60° C. at a constant humidity of 95% RH for 3000 hours, and the tensile break elongation was measured according to ASTM-D638.

[Ash Content]
(1) Five to six grams of a PPS were weighed and placed on a platinum dish burned at 583° C. and cooled.
(2) The PPS was preliminarily burned at 450 to 500° C. together with the platinum dish.
(3) The preliminarily burned PPS sample was placed in a muffle furnace set at 583° C. together with the platinum dish, to be burned for about 6 hours till it was perfectly incinerated.
(4) It was cooled in a desiccator and weighed.
(5) The ash content was calculated from the formula: Ash content (wt %)=(Weight of ash content (g)/Weight of sample (g))×100

[Chloroform Extraction Content]

Ten grams of a PPS polymer were weighed and placed in a thimble, and Soxhlet extraction was carried out (bath temperature 120° C., 5 hours) using 200 mL of chloroform. After completion of extraction, chloroform was removed, and the remaining amount was weighed, the chloroform extraction content per polymer weight being calculated.

[Exothermic Peak Temperature (Tmc)]

DSC-7 produced by Perkin Elmer was used to hold about 8 mg of a sample polymer at 300° C. for 5 minutes and scanned at a cooling rate of 20° C./min, to measure the exothermic peak temperature (Tmc).

[Molding Cycles]

An injection molding machine (SG75H-MIV produced by Sumitomo Heavy Industries, Ltd., cylinder temperature 280° C., mold temperature 130° C., the mold allowed the production of two ASTM Type 1 dumbbell specimens) was used to injection-mold a polyester resin composition, for finding the maximum number of injection times per hour (shots/hr) during which good ASTM Type 1 dumbbell specimens could be obtained. However, in the case where polybutylene terephthalate resin was used as the polyester resin, the cylinder temperature was set at 260° C., and the mold temperature, 80° C.

REFERENCE EXAMPLE 1

Method for Producing Polyphenylene Sulfide Resin (C-1)

A 20-liter autoclave with a stirrer and having a valve at the bottom was charged with 2383 g (20.0 moles) of 47% sodium hydrosulfide (produced by Sankyo Kasei Co., Ltd.), 831 g (19.9 moles) of 96% sodium hydroxide, 3960 g (40.0 moles) of N-methyl-2-pyrrolidone (hereinafter abbreviated as NMP), and 3000 g of ion exchange water. While nitrogen was kept fed at atmospheric pressure, the reaction vessel was gradually heated up to 225° C., taking about 3 hours, to distil away 4200 g of water and 80 g of NMP, and the reaction vessel was cooled to 160° C. The amount of water remaining in the system per mole of the supplied alkali metal sulfide was 0.17 mole. Furthermore, the amount of hydrogen sulfide scattered per mole of the supplied alkali metal sulfide was 0.021 mole.

Then, 2942 g (20.0 moles) of p-dichlorobenzene (produced by Sigma-Aldrich) and 1515 g (15.3 moles) of NMP were added, and the reaction vessel was sealed under nitrogen gas. Subsequently with stirring at 400 rpm, the reaction vessel was heated from 200° C. to 227° C. at a rate of 0.8° C./min, heated up to 274° C. at a rate of 0.6° C./min, held at 274° C. for 50 minutes, and heated up to 282° C. The ejection valve at the bottom of the autoclave was opened, and under pressurization with nitrogen, the content was flashed into a vessel with a stirrer, taking 15 minutes. It was stirred for a while at 250° C. to remove most of NMP, and to recover a solid matter containing polyphenylene sulfide (PPS) and salts.

The obtained solid matter and 15120 g of ion exchange water were fed into an autoclave with a stirrer, and washed at 70° C. for 30 minutes, then being suction-filtered using a glass filter. Subsequently 17280 g of ion exchange water heated to 70° C. was poured into the glass filter and suction-filtered to obtain a cake.

The obtained cake, 11880 g of ion exchange water and 4 g of calcium acetate monohydrate (produced by Sigma-Aldrich) were fed into an autoclave with a stirrer, and the atmosphere in the autoclave was replaced by nitrogen. The autoclave was heated up to 192° C. and held for 30 minutes. Subsequently, the autoclave was cooled, and the content was taken out.

The content was suction-filtered using a glass filter, and 17280 g of 70° C. ion exchange water was poured into the filter and suction-filtered, to obtain a cake. The obtained cake was dried in hot air at 80° C. and further dried in vacuum at 120° C. for 24 hours, to obtain a dry PPS. The obtained PPS had an ash content of 0.6 wt %, a melt viscosity of 12 Pa·s (orifice 0.5 diameter×10 mm, 300° C., shear rate 1000 sec$^{-1}$), and a chloroform extraction content of 3.8%.

REFERENCE EXAMPLE 2

Method for Producing Polyphenylene Sulfide Resin (C-2)

A 20-liter autoclave with a stirrer was charged with 2383 g (20.0 moles) of 47% sodium hydrosulfide (produced by Sankyo Kasei Co., Ltd.), 848 g (20.4 moles) of 96% sodium hydroxide, 3267 g (33 moles) of NMP, 531 g (6.5 moles) of sodium acetate and 3000 g of ion exchange water. While nitrogen was kept fed at atmospheric pressure, the reaction vessel was gradually heated up to 225° C., taking about 3 hours, to distil away 4200 g of water and 80 g of NMP, and subsequently, the reaction vessel was cooled to 160° C. The scattered amount of hydrogen sulfide was 0.018 mole per mole of the supplied alkali metal sulfide.

Then, 3031 g (20.6 moles) of p-dichlorobenzene (produced by Sigma-Aldrich) and 2594 g (26.2 moles) of NMP were added, and the reaction vessel was sealed under nitrogen gas. With stirring at 400 rpm, the reaction vessel was heated up to 227° C. at a rate of 0.8° C./min, subsequently heated up to 270° C. at a rate of 0.6° C./min, and held at 270° C. for 140 minutes. Then, while the reaction vessel was cooled down to 250° C. at a rate of 1.3° C./min, 684 g (38 moles) of ion exchange water was pressed in the autoclave. Then, the reaction vessel was cooled down to 200° C. at a rate of 0.4° C./min, and subsequently quickly cooled to about room temperature.

The content was taken out and diluted with 10 liters of NMP, and the mixture was separated into the solvent and a solid matter using a sieve (80 mesh). The obtained particles were washed with 20 liters of warm water several times, and filtered. The residue was fed into 10 liters of NMP heated to 100° C., and the mixture was stirred for about 1 hour and filtered. The residue was further washed with hot water several times. Then, it was washed with 20 liters of warm water containing 9.8 g of acetic acid, and filtered. The residue was washed with 20 liters of warm water and filtered, to obtain PPS polymer particles. They were dried in hot air at 80° C., and dried in vacuum at 120° C. for 24 hours, to obtain a dry PPS. The obtained PPS had an ash content of 0.02 wt %, a melt viscosity of 40 Pa·s (orifice 0.5 diameter×10 mm, 300° C., shear rate 1000 sec$^{-1}$), and a chloroform extraction content of 0.4%.

REFERENCE EXAMPLE 3

Method for Producing Liquid Crystal Resin (C-3)

A reaction vessel with stirring blades and a distillate pipe was charged with 901 parts by weight of p-hydroxybenzoic acid, 126 parts by weight of 4,4'-dihydroxybiphenyl, 112 parts by weight of terephthalic acid, 346 parts by weight of polyethylene terephthalate with an intrinsic viscosity of about 0.6 dl/g and 884 parts by weight of acetic anhydride. The reaction vessel was heated up to 150° C., taking 2 hours, heated from 150° C. to 250° C., taking 3 hours, heated from 250° C. to 300° C., taking 2 hours, made to react at 300° C. for 1.5 hours, reduced in pressure to 0.5 mm Hg at 300° C., taking 1.5 hours, and further made to react for 10 minutes for polymerization. As a result, a liquid crystal resin (C-3) composed of 72.5 molar equivalents of aromatic oxycarbonyl units, 7.5 molar equivalents of aromatic dioxy units, 20 molar equivalents of ethylene dioxy units, and 27.5 molar equivalents of aromatic dicarboxylic acid units and having a melting point of 265° C. and a melt viscosity of 13 Pa·s (orifice 0.5 diameter× 10 mm, shear rate 1000 sec$^{-1}$) at 275° C. was obtained.

REFERENCE EXAMPLE 4

Method for Producing Liquid Crystal Resin (C-4)

A reaction vessel with stirring blades and a distillate pipe was charged with 907 parts by weight of p-hydroxybenzoic acid, 457 parts by weight of 6-hydroxy-2-naphthoic acid and 873 parts by weight of acetic anhydride, and polymerization was carried out under the same conditions as those used for producing C-1. As a result, a liquid crystal resin (C-4) composed of 73 molar equivalents of oxybenzoate units and 27 molar equivalents of 6-oxy-2-naphthalate units and having a melting point of 283° C. and a melt viscosity of 42 Pa·s (orifice 0.5 diameter×10 mm, shear rate 1000 sec$^{-1}$) at 293° C. could be obtained.

EXAMPLES 1 TO 13 AND COMPARATIVE EXAMPLES 1 TO 6

The PPS C-1 and PPS C-2 respectively described in the above reference examples and the following ingredients were dry-blended at the ratios shown in Table 1. Then, Model TEX30 twin-screw extruder produced by The Japan Steel Works, Ltd. was used to melt-knead the blends with the cylinder temperature set at 250 to 280° C. at a screw speed of 200 rpm, to make strands which were then pelletized using a strand cutter. The pellets were dried by dehumidification at 120° C. overnight and an injection molding machine (SG75H-MIV produced by Sumitomo Heavy Industries, Ltd., cylinder temperature 280° C. and mold temperature 130° C., or cylinder temperature 260° C. and mold temperature 80° C. when polybutylene terephthalate resin was used as the polyester resin) was used to injection-mold the polyester resin compositions, for producing specimens. Furthermore, as shown in Table 1, the following antioxidants were added as required during melt kneading. The low-temperature properties, morphology, etc. of each sample were measured, and the results were as shown in Table 1. The compositions of examples were superior in low-temperature properties (flexibility, impact properties, etc.), flowability, moldability, chemicals resistance, etc., but those of comparative examples were inferior in low-temperature properties, flowability, moldability and chemicals resistance.

The following polyester resins (a) were used in the examples and comparative examples.

(A-1): Polyethylene terephthalate resin of 0.59 in intrinsic viscosity and 49 eq/t in the amount of carboxyl end groups (A-2): Polyethylene terephthalate resin of 0.66 in intrinsic viscosity and 38 eq/t in the amount of carboxyl end groups (A-3): Polyethylene terephthalate resin of 0.75 in intrinsic viscosity and 13 eq/t in the amount of carboxyl end groups (A-4): Polybutylene terephthalate resin of 0.70 in intrinsic viscosity and 35 eq/t in the amount of carboxyl end groups (A-5): Polyethylene-2,6-naphthalene dicarboxylate resin of 0.65 in intrinsic viscosity and 45 eq/t in the amount of carboxyl end groups (A-6): Polyethylene terephthalate/2,6-naphthalene dicarboxylate=92/8 (mol %) resin of 0.75 in intrinsic viscosity, 35 eq/t in the amount of carboxyl end groups, and 234° C. in melting point Similarly the following functional group-containing olefin copolymers (b-1) were used.

(B-1): Ethylene/glycidyl methacrylate=88/12 (wt %) with an MFR of 3 g/10 mm (190° C., 2.16 kg load)

(B-2): Ethylene/glycidyl methacrylate=94/6 (wt %) copolymer with an MFR of 3 g/10 min (190° C., 2.16 kg load)

(B-3): Maleic anhydride-modified ethylene/propylene=85/15 mol % copolymer

Similarly the following ethylene/o:-olefin copolymers (b-2) were used.

(B-4): Ethylene/1-butene copolymer with an MFR of 3.5 g/10 min (190° C., 2.16 kg load) and a density of 0.864/cm$^3$ (B-5): Ethylene/1-butene copolymer with an MFR of 0.5 g/10 min (190° C., 2.16 kg load) and a density of 0.861 g/cm$^3$ (B-6): Ethylene/propylene=85/15 mol % copolymer with an MFR of 0.4 g/10 min (190° C., 2.16 kg load)

Antioxidants: The following two compounds were used.

Phenol-based antioxidant: 3,9-bis[2-(3-(3-t-butyl-4-hydroxy-5-methylphenyl)propionyl-oxy)-1,1-dimethyl-ethyl]-2,4,8,10-tetraoxaspiro[5,5]undecane Phosphorus-based antioxidant: Bis(2,4-di-cumylphenyl) pentaerythritol-di-phosphite

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Polyester resins | A-1 | wt % | 70 | — | — | — | — | — | — | 80 | 60 | 70 |
| | A-2 | wt % | — | 70 | 70 | — | — | — | 90 | — | — | — |
| | A-4 | wt % | — | — | — | 70 | — | — | — | — | — | — |
| | A-5 | wt % | — | — | — | — | 70 | — | — | — | — | — |

TABLE 1-continued

| | | | | | | | | | | | | |
|---|---|---|---|---|---|---|---|---|---|---|---|---|
| | | A-6 | wt % | — | — | — | — | — | 70 | — | — | — | — |
| | | A-3 | wt % | — | — | — | — | — | — | — | — | — | — |
| Olefin-based resins | b-1 | B-1 | wt % | 10 | — | 15 | — | 10 | 3 | 5 | — | — |
| | | B-2 | wt % | — | 10 | — | 10 | 10 | — | — | — | 15 | — |
| | | B-3 | wt % | — | — | — | — | — | — | — | — | — | 20 |
| | b-2 | B-4 | wt % | 20 | — | — | 20 | — | 20 | — | — | 25 | 10 |
| | | B-5 | wt % | — | 20 | 15 | — | 20 | — | 7 | — | — | — |
| | | B-6 | wt % | — | — | — | — | — | — | — | 15 | — | — |
| PPSs | | C-1 | parts by weight | 10 | 5 | 10 | 10 | 5 | 10 | 5 | 5 | 15 | 10 |
| | | C-2 | parts by weight | — | — | — | — | — | — | — | — | — | — |
| Antioxidants | | Phenol-based | parts by weight | — | — | 0.2 | 0.2 | 0.2 | 0.2 | 0.2 | 0.4 | 0.2 | 0.2 |
| | | Phosphorus-based | parts by weight | — | — | 0.2 | 0.2 | 0.2 | 0.2 | 0.2 | 0.4 | 0.2 | 0.2 |
| Observed morphology | | | | A | A | A | A | A | A | A | A | A | A |
| Average particle size | | Polyolefin | μm | 0.5 | 0.6 | 0.5 | 0.8 | 0.8 | 0.9 | 0.5 | 0.7 | 1.2 | 1.8 |
| | | PPS | nm | 25 | 18 | 30 | 28 | 20 | 34 | 19 | 20 | 28 | 24 |
| Tensile break elongation | | −40° C. | % | 32 | 40 | 48 | 30 | 25 | 40 | 21 | 34 | 40 | 20 |
| Impact strength | | −40° C. | J/m | 640 | 750 | 750 | 610 | 520 | 650 | 520 | 680 | 850 | 500 |
| HFIP resistance | | Weight reduction rate | % | 2.2 | 3.7 | 2.3 | 2.1 | 1.6 | 2.1 | 4.6 | 3.7 | 0.8 | 2.8 |
| Hydrolysis resistance | | Tensile break elongation | % | 70 | 60 | 80 | 60 | 75 | 75 | 35 | 40 | 55 | 30 |
| Exothermic peak temperature | | Tm c | ° C. | 199 | 194 | 200 | — | — | — | 191 | 192 | 201 | 196 |
| Flowability | | Lower limit pressure of molding | MPa · G | 1.8 | 3.1 | 3.3 | 2.8 | 3.4 | 2.9 | 1.2 | 1.5 | 2.9 | 2.4 |
| | | Molding cycles | shots/hr | 180 | 160 | 180 | 220 | 120 | 120 | 140 | 140 | 200 | 160 |
| | | Chemicals resistance | | A | A | A | A | A | A | A | A | A | A |

| | | | | Examples | | | Comparative Examples | | | | | |
|---|---|---|---|---|---|---|---|---|---|---|---|---|
| | | | | 11 | 12 | 13 | 1 | 2 | 3 | 4 | 5 | 6 |
| Polyester resins | | A-1 | wt % | 70 | 70 | 70 | 70 | — | — | — | — | — |
| | | A-2 | wt % | — | — | — | — | 70 | — | — | — | 55 |
| | | A-4 | wt % | — | — | — | — | — | — | — | — | — |
| | | A-5 | wt % | — | — | — | — | — | — | — | — | — |
| | | A-6 | wt % | — | — | — | — | — | — | — | — | — |
| | | A-3 | wt % | — | — | — | — | — | 70 | 70 | 80 | — |
| Olefin-based resins | b-1 | B-1 | wt % | 10 | 10 | 10 | 30 | — | 10 | 10 | — | 20 |
| | | B-2 | wt % | — | — | — | — | — | — | — | 5 | — |
| | | B-3 | wt % | — | — | — | — | — | — | — | — | — |
| | b-2 | B-4 | wt % | 20 | 20 | 20 | — | 30 | 20 | 20 | — | — |
| | | B-5 | wt % | — | — | — | — | — | — | — | 15 | 25 |
| | | B-6 | wt % | — | — | — | — | — | — | — | — | — |
| PPSs | | C-1 | parts by weight | — | — | — | 10 | — | — | 10 | — | 15 |
| | | C-2 | parts by weight | 5 | 10 | 15 | — | 10 | — | — | 5 | — |
| Antioxidants | | Phenol-based | parts by weight | 0.2 | 0.2 | 0.2 | — | — | 0.2 | 0.2 | 0.2 | 0.2 |
| | | Phosphorus-based | parts by weight | 0.2 | 0.2 | 0.2 | — | — | 0.2 | 0.2 | 0.2 | 0.2 |
| Observed morphology | | | | A | A | A | A | A | A | A | A | B |
| Average particle size | | Polyolefin | μm | 0.5 | 0.6 | 0.6 | 1.2 | 10 | 3.3 | 3.7 | 4.2 | — |
| | | PPS | nm | 42 | 49 | 53 | 190 | 45 | — | 220 | 230 | 310 |
| Tensile break elongation | | −40° C. | % | 38 | 32 | 30 | 10 | 7 | 35 | 30 | 24 | 17 |
| Impact strength | | −40° C. | J/m | 670 | 620 | 520 | 70 | 50 | 280 | 220 | 200 | 730 |
| HFIP resistance | | Weight reduction rate | % | 3.3 | 2.4 | 1.1 | 7.3 | 10 | 12 | 7.7 | 8.2 | 5.3 |
| Hydrolysis resistance | | Tensile break elongation | % | 75 | 60 | 65 | 40 | 5 | 60 | 60 | 50 | 25 |
| Exothermic peak temperature | | Tm c | ° C. | 186 | 190 | 194 | 181 | 178 | 172 | 180 | 175 | 188 |
| Flowability | | Lower limit pressure of molding | MPa · G | 2.8 | 2.5 | 2.2 | 5.3 | 3.0 | 6.0 | 5.3 | 3.8 | 6.1 |
| | | Molding cycles | shots/hr | 120 | 140 | 140 | 80 | 60 | 60 | 80 | 60 | 100 |
| | | Chemicals resistance | | A | A | A | C | D | D | D | B | D |

EXAMPLES 14 TO 25 and COMPARATIVE EXAMPLES 7 TO 11

The liquid crystal resins C-3 and C-4 respectively described in the above reference examples and the respective ingredients used in Examples 1 to 13 were dry-blended at the ratios shown in Table 2. Then, Model TEX30 twin-screw extruder produced by The Japan Steel Works, Ltd. was used to melt-knead the blends with the cylinder temperature set at 280 to 300° C. at a screw speed of 200 rpm, to make strands which were then pelletized using a strand cutter. The pellets were dried by dehumidification at 120° C. overnight and an injection molding machine (SG75H-MIV produced by Sumitomo Heavy Industries, Ltd., cylinder temperature 280° C. and mold temperature 130° C., or mold temperature 80° C. when polybutylene terephthalate resin was used) was used to injection-mold the polyester resin compositions, for producing specimens. The low-temperature properties, morphology, etc. of each sample were measured, and the results were as shown in Table 2. The compositions of examples were superior in low-temperature properties (flexibility, impact properties, etc.), flowability, moldability, chemicals resistance, etc., but those of comparative examples were inferior in low-temperature properties, flowability, moldability and chemicals resistance.

TABLE 2

|  |  |  | Examples | | | | | | | | |
| --- | --- | --- | --- | --- | --- | --- | --- | --- | --- | --- | --- |
|  |  |  | 14 | 15 | 16 | 17 | 18 | 19 | 20 | 21 | 22 |
| Polyester resins | A-1 | wt % | 70 | — | — | — | — | — | — | 80 | 60 |
|  | A-2 | wt % | — | 70 | 70 | — | — | — | 90 | — | — |
|  | A-4 | wt % | — | — | — | 70 | — | — | — | — | — |
|  | A-5 | wt % | — | — | — | — | 70 | — | — | — | — |
|  | A-6 | wt % | — | — | — | — | — | 70 | — | — | — |
|  | A-3 | wt % | — | — | — | — | — | — | — | — | — |
| Olefin-based resins b-1 | B-1 | wt % | 10 | — | 15 | — | — | 10 | 3 | 5 | — |
|  | B-2 | wt % | — | 10 | — | 10 | 10 | — | — | — | 15 |
|  | B-3 | wt % | — | — | — | — | — | — | — | — | — |
| b-2 | B-4 | wt % | 20 | — | — | 20 | — | 20 | — | — | 25 |
|  | B-5 | wt % | — | 20 | 15 | — | 20 | — | 7 | — | — |
|  | B-6 | wt % | — | — | — | — | — | — | — | 15 | — |
| Liquid crystal resin | C-3 | parts by weight | 10 | 5 | 10 | 10 | 5 | 10 | 5 | 5 | 15 |
|  | C-4 | parts by weight | — | — | — | — | — | — | — | — | — |
| Antioxidants | Phenol-based | parts by weight | — | — | 0.2 | 0.2 | 0.2 | 0.2 | 0.2 | 0.4 | 0.2 |
|  | Phosphorus-based | parts by weight | — | — | 0.2 | 0.2 | 0.2 | 0.2 | 0.2 | 0.4 | 0.2 |
| Observed morphology |  |  | A | A | A | A | A | A | A | A | A |
| Average particle size | Polyolefin | μm | 0.6 | 0.8 | 0.7 | 0.9 | 0.7 | 0.9 | 0.5 | 0.7 | 1.0 |
|  | Liquid crystal resin | nm | 62 | 55 | 70 | 65 | 45 | 59 | 50 | 51 | 75 |
| Tensile | −40° C. | % | 30 | 45 | 50 | 31 | 35 | 40 | 25 | 39 | 45 |
| Impact | −40° C. | J/m | 600 | 780 | 730 | 600 | 550 | 650 | 570 | 640 | 800 |
| HFIP resistance | Weight reduction rate | % | 1.8 | 3.5 | 2.3 | 2.4 | 1.7 | 2.0 | 4.2 | 3.8 | 1.3 |
| Hydrolysis resistance | Tensile break elongation | % | 75 | 60 | 85 | 65 | 70 | 75 | 30 | 45 | 60 |
| Flowability | Lower limit pressure of molding | MPa · G | 1.7 | 2.7 | 3.1 | 2.5 | 3.1 | 2.8 | 1.4 | 1.7 | 3.1 |
| Molding cycles |  | shots/hr | 160 | 140 | 160 | 180 | 110 | 120 | 120 | 130 | 160 |
| Chemicals resistance |  |  | A | A | A | A | A | A | A | A | A |

|  |  |  | Examples | | | Comparative Examples | | | | |
| --- | --- | --- | --- | --- | --- | --- | --- | --- | --- | --- |
|  |  |  | 23 | 24 | 25 | 7 | 8 | 9 | 10 | 11 |
| Polyester resins | A-1 | wt % | 70 | 70 | 70 | 70 | — | — | — | — |
|  | A-2 | wt % | — | — | — | — | 70 | — | — | 55 |
|  | A-4 | wt % | — | — | — | — | — | — | — | — |
|  | A-5 | wt % | — | — | — | — | — | — | — | — |
|  | A-6 | wt % | — | — | — | — | — | — | — | — |
|  | A-3 | wt % | — | — | — | — | — | 70 | 80 | — |
| Olefin-based resins b-1 | B-1 | wt % | — | 10 | 10 | 30 | — | 10 | — | 20 |
|  | B-2 | wt % | — | — | — | — | — | — | 5 | — |
|  | B-3 | wt % | 20 | — | — | — | — | — | — | — |
| b-2 | B-4 | wt % | 10 | 20 | 20 | — | 30 | 20 | — | — |
|  | B-5 | wt % | — | — | — | — | — | — | 15 | 25 |
|  | B-6 | wt % | — | — | — | — | — | — | — | — |
| Liquid crystal resin | C-3 | parts by weight | 5 | — | — | 10 | 10 | 10 | 5 | 15 |
|  | C-4 | parts by weight | — | 5 | 10 | — | — | — | — | — |
| Antioxidants | Phenol-based | parts by weight | 0.2 | 0.2 | 0.2 | — | — | 0.2 | 0.2 | 0.2 |

TABLE 2-continued

|  |  |  |  |  |  |  |  |  |  |  |
|---|---|---|---|---|---|---|---|---|---|---|
|  | Phosphorus-based | parts by weight | 0.2 | 0.2 | 0.2 | — | — | 0.2 | 0.2 | 0.2 |
|  | Observed morphology |  | A | A | A | A | A | A | A | B |
| Average particle size | Polyolefin | μm | 1.8 | 0.7 | 0.9 | 1.3 | 10.1 | 3.5 | 4.2 | — |
|  | Liquid crystal resin | nm | 47 | 52 | 68 | 210 | 77 | 190 | 160 | 380 |
| Tensile | −40° C. | % | 25 | 35 | 35 | 9 | 7 | 25 | 18 | 15 |
| Impact | −40° C. | J/m | 650 | 600 | 520 | 50 | 30 | 180 | 135 | 690 |
| HFIP resistance | Weight reduction rate | % | 3.3 | 3.4 | 1.7 | 6.9 | 9.5 | 7.5 | 9.2 | 5.9 |
| Hydrolysis resistance | Tensile break elongation | % | 50 | 75 | 80 | 50 | 10 | 50 | 55 | 30 |
| Flowability | Lower limit pressure of molding | MPa·G | 3.4 | 2.6 | 2.3 | 6.5 | 2.4 | 3.7 | 2.4 | 5.5 |
|  | Molding cycles | shots/hr | 140 | 110 | 140 | 65 | 60 | 70 | 40 | 80 |
|  | Chemicals resistance |  | A | A | A | C | D | D | B | D |

INDUSTRIAL APPLICABILITY

Provide a polyester resin composition having excellent mechanical properties, especially excellent flexibility and impact properties in a low temperature atmosphere as low as −40° C., and also having excellent flowability and chemicals resistance, and suitable for injection molding.

The polyester resin composition is especially useful for an application as injection-molded parts, since it is excellent in impact properties and flowability. It is especially suitable for use as structural materials such as pipes and cases for general apparatuses and motor vehicles, molded parts with metallic inserts for electric and electronic use, etc., since it has excellent flexibility and impact properties in a low temperature atmosphere and also having excellent flowability and chemicals resistance.

The invention claimed is:

1. A polyester resin composition comprising: 1) 100 parts by weight of a resin composition consisting of 60 to 90 wt % of (a) a polyester resin with an amount of carboxyl end groups of from 35 to 49 eq/t and is at least one selected from the group consisting of polyethylene terephthalate, polyethylene-2,6-naphthalene dicarboxylate and their copolymers, and 10 to 40 wt % of (b) an olefin-based resin, and 2) 5 to 15 parts by weight of (c) one or more resins selected from polyphenylene sulfide resins and liquid crystal resins, wherein said olefin-based resin (b) comprises 3 to 20 wt % of (b-1) a functional group-containing olefin copolymer having at least one kind of functional groups selected from carboxylic acid groups, carboxylic anhydride groups and epoxy groups and 7 to 25 wt % of (b-2) an ethylene/α-olefin copolymer obtained by copolymerizing ethylene and an α-olefin with 3 to 20 carbon atoms; and the polyester resin (a) forms a continuous phase, while the olefin-based resin (b) is dispersed as particles with an average particle size of 0.01 to 2 μm in the composition, and the polyphenylene sulfide resin (c) or liquid crystal resin is dispersed in the polyester resin (a) phase as particles having an average particle size of 1 to 100 nm and the polyphenylene sulfide has a melt viscosity of 12 to 40 Pa·s.

2. The polyester resin composition according to claim 1, the weight reduction rate of which after having been immersed in 23° C. hexafluoroisopropanol for 1 hour is from 0 to 5%.

3. The polyester resin composition according to claim 1, wherein the functional group-containing olefin copolymer (b-1) is an olefin copolymer having epoxy groups.

4. The polyester resin composition according to claim 1, wherein the functional group-containing olefin copolymer (b-1) is a copolymer obtained from ethylene and/or an α-olefin and an αβ-unsaturated carboxylic acid glycidyl ester.

5. The polyester resin composition according to claim 1, wherein the ingredient (c) is a polyphenylene sulfide resin which has an ash content of 0.1 to 2 wt %.

6. The polyester resin composition according to claim 1, wherein the ingredient (c) is a polyphenylene sulfide resin which has a chloroform extraction content of 1 to 5 wt %.

7. The polyester resin composition according to claim 1, which has a tensile break elongation of 20 to 400% as measured according to ASTM-D638 at a temperature of −40° C. and an impact strength of 500 to 2000 J/m as measured according to ASTM-D-256.

8. The polyester resin composition according to claim 1, wherein the polyester resin (a) is polyethylene terephthalate, and the exothermic peak temperature (Tmc) observed in the differential calorimetry of the resin composition during cooling from 300° C. at a cooling rate of 20° C./min is 190° C. or higher.

* * * * *